Dec. 6, 1960 G. K. JENSEN 2,963,654
STAIRCASE GENERATOR WITH MEANS INCLUDING CLAMP FOR ADJUSTING STEPS WITHOUT INTERACTION BETWEEN CONSECUTIVE STAIRCASES
Filed Oct. 27, 1959
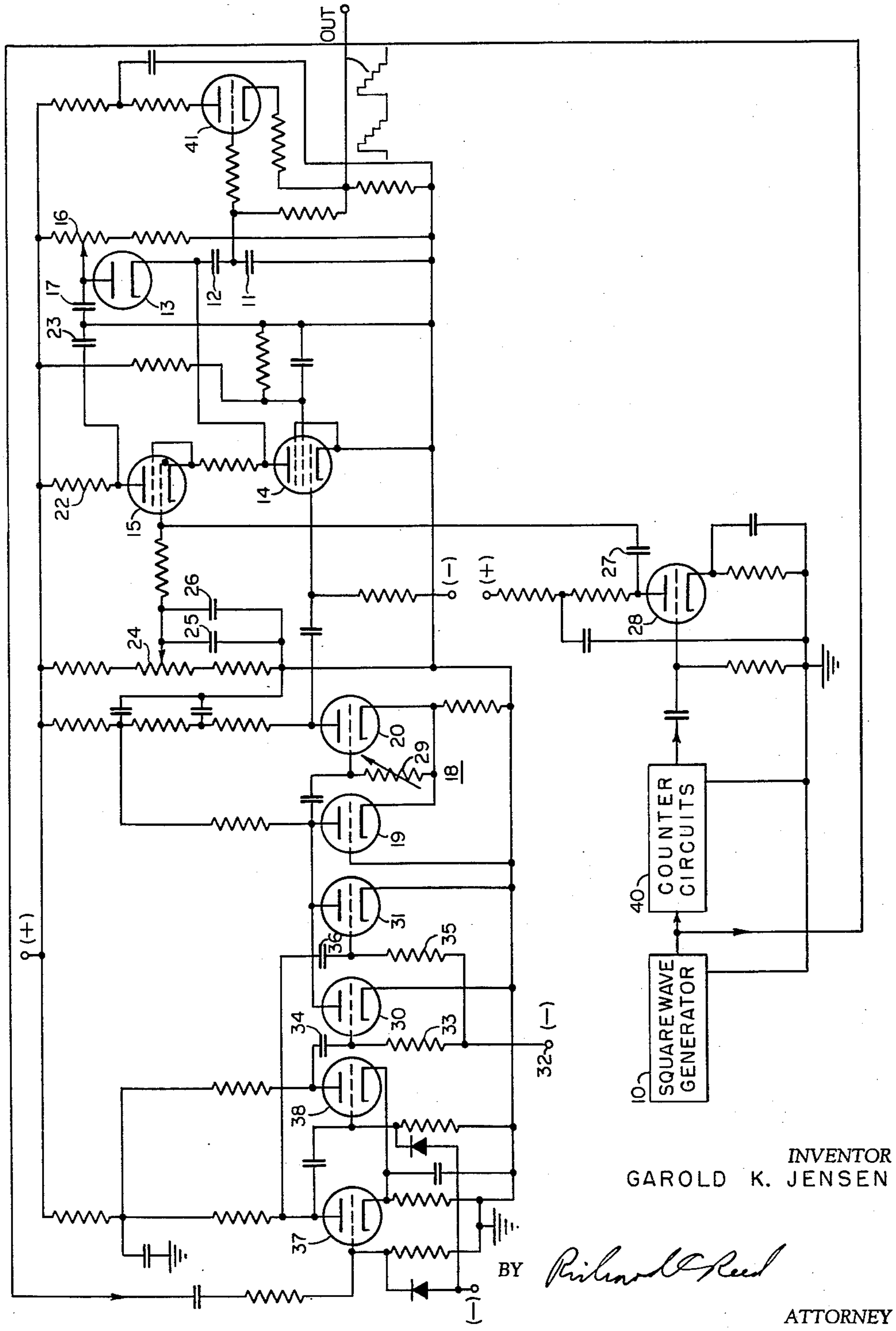
INVENTOR
GAROLD K. JENSEN
BY Richard C. Reed
ATTORNEY United States Patent Office 2,963,654

Patented Dec. 6, 1960

2,963,654

STAIRCASE GENERATOR WITH MEANS INCLUDING CLAMP FOR ADJUSTING STEPS WITHOUT INTERACTION BETWEEN CONSECUTIVE STAIRCASES

Garold K. Jensen, Pinecrest, Va., assignor to the United States of America as represented by the Secretary of the Navy Filed Oct. 27, 1959, Ser. No. 849,123

4 Claims. (Cl. 328—186)

(Granted under Title 35, U.S. Code (1952), sec. 266)

The invention described herein may be manufactured and used by or for the Government of the United States of America for governmental purposes without the payment of any royalties thereon or therefor.

This invention relates to electrical signal generators in general and in particular to signal generators for producing a stepwise changing voltage wherein a high degree of uniformity between steps is maintained despite variations in periodicity of the waveforms and number and position of the individual steps of the waveforms.

In many applications of electronic equipment it is desired to produce a stepwise changing signal waveform having a plurality of unit functions which occur over a selected interval of time, the unit functions being additive until a selected time instant at which a reversion to an initial condition occurs. In applications of such devices it may also occur that the group of unit functions comprising a particular stepped waveform between the extremes of the starting point and the maximum change therefrom is variable in repetition rate. In such an instance it is particularly difficult to maintain uniformity of amplitude of the individual unit functions making it impossible by conventional prior art methods such as would be well known to those skilled in the art to maintain overall uniformity of operation.

It is accordingly an object of the present invention to provide a generator for a stepwise signal, such generator having a high degree of stability.

Another object of the present invention is to provide a signal generator for producing a repetitive plurality stepwise changing voltage which contains a plurality of unit functions of uniform amplitude which are additive over a period of time until a selected level is reached.

Other and further objects and features of the present invention will become apparent upon a careful consideration of the accompanying description and detailed drawings wherein the single figure of the drawing indicates a typical embodiment of the features of the present invention.

With reference now to the drawing, the apparatus shown therein is indicated as typifying the invention in a form which places a great demand upon the stability of operation. In particular the apparatus is intended to produce a recurrent stepwise waveform having two stepwise portions or pulses as indicated in proximity to the output terminal, wherein the time separation between the initiation of the second pulse of each pair of pulses is variable, and the initial pulse of each pair occurs at a repetition rate which can also be subject to variation. This type of waveform places a great demand upon the stability of the circuit because of the fact that the time separation between the pulses of a pair is not only subject to variation but that the time separation between the pulses of the pair is different from that between the last pulse of one pair and the first pulse of the next succedent pair. Each pulse of the waveform indicated has a stepped nature wherein the pulse starts out at a large initial amplitude and is successively reduced in amplitude in uniform amplitude steps separated by uniform amplitude periods of time.

The waveform indicated as the output waveform is produced by the charging and discharging of capacitance 11. Capacitance 11 has one terminal thereof connected to ground and the other connected through a larger capacitance 12 to the cathode of a diode 13, the anode of a pentode 14, and the cathode of a soft tetrode 15. The anode of tube 13 is connected to the variable tap of a potentiometer 16 by means of which a selectable D.C. potential may be maintained at the anode of tube 13. The maintenance of such a potential is of no particular effect when the cathode of tube 13 is at a higher potential, however it does provide a means of clamping the minimum potential attained at the cathode of tube 13. In addition the anode of tube 13 is by-passed to ground by means of a large electrolytic capacitance 17 to provide a low impedance path for brief instants of high conductivity by diode 13.

Tube 14 is maintained in a normally cut-off condition by virtue of the connection of the grid thereof to a negative source. In addition the grid of tube 14 is connected to a pulse generator indicated in general by 18 having the two triode electron tubes 19 and 20, the grid of tube 14 being coupled by means of a D.C. blocking capacitance to the anode of tube 20.

The anode of tube 15 is connected to the positive potential source through a decoupling filter consisting of the resistance 22 and capacitance 23. The first grid of tube 15 is connected to a controllable D.C. potential as obtained from the tap of potentiometer 24, such tap being bypassed to ground by the capacitances 25 and 26, one being a large capacity electrolytic unit, the other being a smaller capacity unit such as a paper or ceramic condenser providing more effective bypassing of higher frequency components of the signal existing at that point. In addition, the first control grid of tube 15 is connected by means of a capacitance 27 to the anode of keying tube 28.

The pulse generator 18 is a one-shot multivibrator by means of which a controllable duration pulse is produced for application to the control grid of tube 14 by the connection previously mentioned. The duration of this control pulse is controllable by means of a variable resistor 29 placed in the grid circuit of tube 20 which controls the duration of the unstable condition of the one shot multivibrator. Keying of the one-shot multivibrator 18 is provided by anode paralleled keying tubes 30 and 31 which are biased by the return of their grids to a negative supply indicated in general by the numeral 32, the bias being of such magnitude as to maintain tubes 30 and 31 in a normally cut-off condition. The grid circuits of tubes 30 and 31 include resistance capacitance coupling units 33—34, 35—36 which are of the short time constant variety providing differentiating action. Thus in response to the application of square wave signals, short spikes of alternate polarities are applied to the grids of tubes 30 and 31, the positive polarity spikes being operative to produce conduction in the tubes 30 and 31.

The grids of tubes 30 and 31 are coupled by means of the capacitances 34 and 36 to the anodes of tubes 37 and 38, the two tubes being in an inversion circuit wherein pulses applied to the grid of tube 37 are obtained at the anode of tube 38 in a polarity opposite thereto. The purpose of this inverter form of input circuit is to apply keying pulses to the multivibrator 18 at twice the frequency of the square wave signal produced by a square wave generator 10 which is connected to the grid of tube 37. Such a circuit configuration thus establishes the frequency of application of pulses to the grid of the tube 14 as twice that of the frequency of the square wave signal produced by square wave generator 10.

The grid of tube 28 is coupled to the counter circuits 40 which control the keying of tube 28 which as previously indicated causes the operation of tube 15. In actuality the counter circuits 40 are any combination of well known circuits, typically Eccles-Jordan counter circuits, the combination being made according to well established engineering principles to supply a pulse at a fixed division rate relative to the output of the square wave generator 10 to cause the initiation of the first pulse of the pair indicated as output pulses. In addition the counter circuits 40 include a second group of counter circuits which control the time separation of the first and second pulses of each pair indicated at the output terminal.

Such a typical relationship of the control pulses permits a positive control over the production of the output signal with each pair of stepped pulses occurring at a fixed relationship to an individual cycle in the output of the square wave generator 10 and likewise there being also a selected number of square wave cycles occurring between the first and second pulses of the output pair. Such a critical arrangement is typical of the high degree of accuracy and stability desired in the overall circuit. It is to be understood however that in less critical applications simpler forms of keying of the various circuits could be used to some advantage, it being possible for example to use delay lines to produce the separation between the pairs of pulses as well as the first and second pulse of each pair. The accurate timing of the various keying pulses made possible by the particular combination of apparatus indicated herein does maintain uniformity in the duration of the individual steps in each stepped pulse, a condition not readily obtainable without such close control over the keying as provided herein.

The operation of the circuit just described may be understood more easily by selecting a portion of the cycle immediately preceding the start of the first stepped pulse of the pair constituting the basic output waveform indicated as being produced at the output terminal. In the portion immediately prior to the start of the first pulse, the diode 13 is conductive to maintain the potential at the cathode thereof and hence the potential at the junction between capacitances 11 and 12 at a fixed low point on the cycle. This situation could have prevailed for a long time and in fact did prevail since the conclusion of the second stepped pulse of the preceding double pulse waveform that had been produced by the circuit. At the beginning of the first stepped pulse of the pair, a pulse is delivered by the counter circuits 40 to tube 28 to result in the raising of the grid potential of tube 15 to a sufficiently positive point to cause the initiation of conduction in tube 15. When this occurs the grid of tube 15 thereafter loses control of the anode current in tube 15 and a large current continues to flow in tube 15 until such time as the capacitances 11 and 12 are charged to a point at which the voltage across tube 15 is no longer sufficient to maintain conduction in that tube. At this point conduction ceases in tube 15, the rapid potential rise across the capacitances 11 and 12 ceases, and the potential at the ungrounded end of capacitance 11 reaches and maintains a preselected constant level. This level is independent of other variable quantities in the circuit being dependent primarily on the extinction potential of tube 15 and the value of the B+ voltage. Since these two quantities can be maintained substantially constant without any great difficulty, the peak potential in a positive direction reached during the first pulse of the pair of stepped pulses is substantially constant. This level is maintainable for a long duration because of the fact that with tubes 13, 14 and 15 cut-off there is substantially no current drain upon the capacitances 11 and 12 as a result of the remaining load, the output cathode follower 41 connected between capacitance 11 and the output terminal. At a subsequent interval in time, after a period equal to approximately half the period of the square wave generator 10, a positive pulse is applied to the grid of tube 14, producing momentary high conductivity in tube 14 which effects a partial discharge of the capacitances 11 and 12 resulting in a rapid drop from the previously existing potential across the capacitances. Thus is produced the first step of the first stepped pulse of the paired output waveform. Again the level reached at the conclusion of the brief period of conductivity of tube 14 is retained without substantial variation until a subsequent period of conductivity by tube 14 is realized corresponding to the conclusion of the second half period of the waveform produced by the square wave generator 10. This brief periodic discharge of capacitances 11 and 12 continues until such time as the potential at the cathode of tube 13 falls to the potential of the anode of tube 13 at which time tube 13 becomes conductive to prevent further drop in potential across the capacitances, thereby reestablishing the minimum level which existed prior to the first pulse delivered to tube 15.

Control of the duration of conduction in tube 14 and hence of the magnitude of each individual discharge step is provided by the potentiometer 29 located in the one shot multivibrator circuit 18 which controls the duration of the unstable period in the circuit. Thus if the unstable period of the one-shot multivibrator circuit 18 is made longer, tube 14 conducts for a longer time at each period of conduction to thereby produce a greater discharge of the capacitances 11 and 12. Uniformity of the individual steps constituting the discharge portions of the waveforms is obtained by employing a pentode type tube 14 having high and constant plate circuit resistance. This assures a constant current form of discharge of the capacitances which maintains uniformity in voltage change. The potentiometer 24 is adjusted to control the grid potential of tube 15 to insure that the tube 15 is capable of being brought to conduction by a pulse obtained from tube 28 when the potential across the capacitances 11 and 12 is at the level established by the anode potential of tube 13. It is possible by adjustment of the potentiometer 24 to cause the circuit to free-run without requiring triggering pulses from tube 28. In some instances this may be desirable, however, in certain uses of the particular circuit shown this is not desired and hence the adjustment would be made in such a way as to prevent free-running operation. Another interrelated control is the potentiometer 16 which as previously mentioned controls the voltage which constitutes the "floor" between individual pulses. It is worthy of note at this point that potentiometer 16 would normally be adjusted to insure that operation of tube 14 remains in the constant current region above the knee of the curve at all times.

The apparatus has been described as producing the first pulse of the output pair of pulses, a second pulse also of an identical stepped nature will be produced upon the occurrence of a second triggering pulse produced by counter circuits 40 and applied through keying tube 28. Such a pulse will occur in coincidence with the start of one of the half cycles of the output of square wave generator. Using these principles it would be a comparatively simple matter to arrange appropriate counter circuitry to produce a repetitive waveform having three or more stepped pulses rather than the two pulses shown, and likewise to provide a greater or lesser quantity of steps on each pulse instead of that shown as representative of the output waveform.

Obviously many modifications and variations of the present invention are possible in the light of the above teachings. It is therefore to be understood that within the scope of the appended claims the invention may be practiced otherwise than as specifically described.

trol means when said member has pivoted into holding

What is claimed is:

1. In an electrical signal generator, an energy storage device, means for periodically charging said storage device to a selected level, means for periodically withdrawing a selected quantity of energy from said energy storage device to produce a series of withdrawals between each charging, the duration of each of said withdrawals being small relative to the time separation of said withdrawals, means for establishing a minimum level at which energy withdrawal from said energy storage device is terminated, and means for adjusting the relationship of the energy withdrawal, charging, and the minimum levels whereby the minimum level persists between the last withdrawal of one series and the charging for a subsequent series.

2. In an electrical signal generator, an energy storage device, means for periodically charging said storage device to a selected level, constant current discharge means for periodically withdrawing a selected quantity of energy from said energy storage device to produce a series of withdrawals between each charging, the duration of each of said withdrawals being small relative to the time separation of said withdrawals, means for establishing a minimum level at which energy withdrawal from said energy storage device is terminated, and means for adjusting the relationship of the energy withdrawal, charging, and the minimum levels whereby the minimum level persists between the last withdrawal of one series and the charging for a subsequent series.

3. In an electrical signal generator, an energy storage device, means for producing multiple charging control pulse groups wherein the time spacing between pulses of the groups is controllable and the repetition rate of the groups is controllable, means responsive to the charging control pulses for charging said storage device to a selected level, means for periodically withdrawing a selected quantity of energy from said energy storage device to produce a series of withdrawals between each charging, the duration of each of said withdrawals being small relative to the time separation of said withdrawals, means for establishing a minimum level at which energy withdrawal from said energy storage device is terminated, and means for adjusting the relationship of the energy withdrawal, charging, and the minimum levels whereby the minimum level persists between the last withdrawal of one series and the charging for a subsequent series.

4. In an electrical signal generator, an energy storage device, means for periodically charging said storage device to a selected level, means for periodically withdrawing a selected quantity of energy from said energy storage device to produce a series of withdrawals between each charging, the duration of each of said withdrawals being small relative to the time separation of said withdrawals, means for controlling the duration of the withdrawal period, means for establishing a minimum level at which energy withdrawal from said energy storage device is terminated, and means for adjusting the relationship of the energy withdrawal, charging, and the minimum levels whereby the minimum level persists between the last withdrawal of one series and the charging for a subsequent series.

References Cited in the file of this patent

UNITED STATES PATENTS

| | | |
|---|---|---|
| 2,619,618 | Adler | Nov. 25, 1952 |
| 2,774,871 | Dow | Dec. 18, 1956 |
| 2,796,314 | Bishop et al. | June 18, 1957 |
| 2,829,280 | Goodall | Apr. 1, 1958 |
| 2,874,280 | McCulley | Feb. 17, 1959 |
| 2,922,041 | Boyle | Jan. 19, 1960 |